United States Patent [19]

Hilker et al.

[11] Patent Number: 4,683,775
[45] Date of Patent: Aug. 4, 1987

[54] DIFFERENTIAL AXLE SPEED SENSING MECHANISM

[75] Inventors: Gregory J. Hilker; Edward A. Tieman, both of Ft. Wayne, Ind.

[73] Assignee: Dana Corporation, Toledo, Ohio

[21] Appl. No.: 806,306

[22] Filed: Dec. 9, 1985

[51] Int. Cl.⁴ .............................................. F16H 1/38
[52] U.S. Cl. ........................................ 74/710; 74/713
[58] Field of Search ...................... 74/710, 711, 710.5, 74/713

[56] References Cited

U.S. PATENT DOCUMENTS

| 3,138,970 | 6/1964 | Costa et al. | 74/711 |
| 3,605,523 | 9/1971 | O'Brien | 74/711 |
| 3,719,841 | 3/1973 | Ritsema | 310/155 |
| 3,769,533 | 10/1973 | Pauwels | 74/711 |
| 3,927,339 | 12/1975 | Paul et al. | 310/155 |
| 3,949,841 | 4/1976 | Jovick et al. | 188/181 R |
| 4,090,592 | 5/1978 | Jovick et al. | 188/181 R |
| 4,263,824 | 4/1981 | Mueller | 74/711 |
| 4,597,311 | 7/1986 | Takeda | 74/710 |

FOREIGN PATENT DOCUMENTS

| 2644191 | 5/1977 | Fed. Rep. of Germany | 74/710 |
| 1188863 | 4/1970 | United Kingdom | 74/710 |
| 2067685 | 7/1981 | United Kingdom | 74/711 |

Primary Examiner—Rodney H. Bonck
Assistant Examiner—David A. Testardi
Attorney, Agent, or Firm—Frank B. McDonald

[57] ABSTRACT

A speed sensing differential axle mechanism provides a plurality of teeth formed in a small diameter end portion of a differential case. In a preferred form, the teeth are integral to the case, spaced uniformly about the small diameter end portion thereof, and are disposed for relative rotation with respect to a stationary electronic pickup element secured rigidly in an associated external carrier. In the preferred embodiment, the pickup element is totally enclosed within the carrier, whereby it is protected from external environments, as well as from splash and spray oil circulating within the differential assembly. For the latter purpose, an internal baffle is utilized to protect the internal pickup element from the oil.

12 Claims, 3 Drawing Figures

– 4,683,775 –

DIFFERENTIAL AXLE SPEED SENSING MECHANISM

BACKGROUND OF THE INVENTION

This invention relates to speed sensing differential axle assemblies. More particularly, the invention relates to placement of sensing devices within an axle system, particularly with respect to the differential case thereof.

There are numerous prior art axle assemblies which provide speed sensing mechanisms within differential axle housings. Most involve a placement at the ring gear flange of the differential assembly, or are directly affixed to a trunnion extending from and typically integral with the ring gear flange. There are many drawbacks to the placement of a pickup element in either of the latter positions. One major drawback is the heat generated by the toothed element rotating in the circulating oil within the carrier housing.

An additional drawback relates to the use of pressed rings containing teeth for registration with the pickup element, thus requiring additional parts, extra tooling and machining, potential seating problems for the extra parts, and increased runout which causes transducer sensing problems. Finally, where such speed sensing systems are placed on the ring gear differential flanges, the tolerances can be affected by bending distortions of the ring gear under various dynamic loading conditions, as will be appreciated by those skilled in the art.

SUMMARY OF THE INVENTION

The invention presented and disclosed herewith provides a system wherein all of the aforenoted disadvantages of the prior art are either minimized or entirely eliminated. Thus, the speed sensing differential mechanism of this invention is not subjected to excessive splash and spray oil contamination. The invention requires no use of pressed rings and thus avoids the necessity of tooling for additional parts, and the related seating problems associated therewith. In addition, the noted tolerance problems are minimized.

In a preferred form, the speed sensing differential axle mechanism of the present invention provides a plurality of teeth integrally formed in the small diameter end portion of a differential case. The teeth are spaced uniformly about the small diameter end portion which is positioned oppositely of the ring gear flange end of the case. A stationary electronic pickup element extends toward the teeth and is spaced therefrom by a gap of conventional dimensions. The pickup element extends from, and is secured in, a cover plate on the differential housing for ease of access and convenience. In a preferred form, the teeth are cast integrally within the small diameter end portion of the case, and are machined symmetrically with respect to the case axis.

DETAILED DESCRIPTION OF A PREFERRED EMBODIMENT

Figure 1:
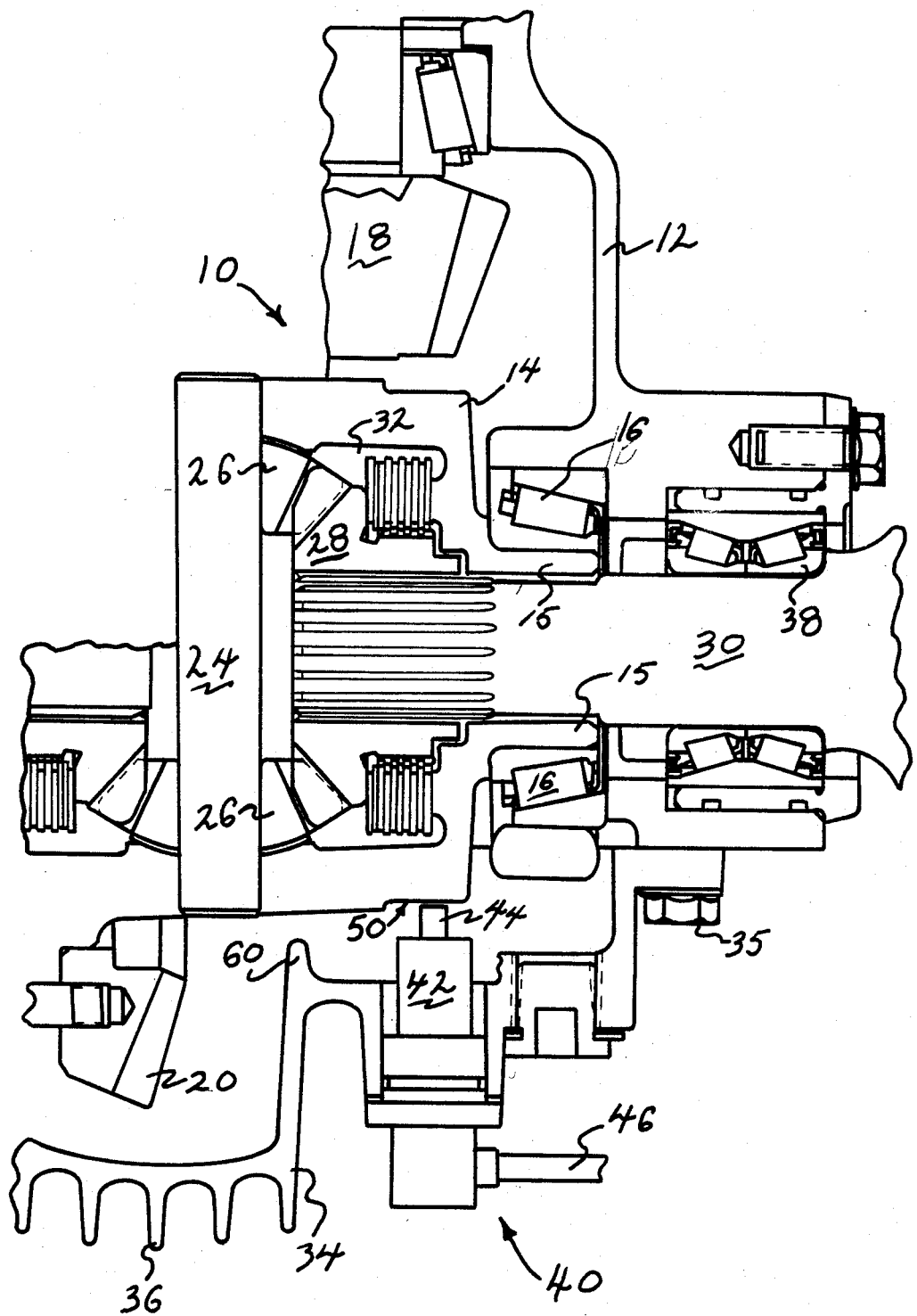
FIG. 1 is a fragmentary cross sectional view of a differential axle assembly which incorporates a preferred embodiment of the speed sensing mechanism of the present invention.

Referring initially to FIG. 1, a differential axle assembly 10 includes an external housing or carrier 12. The carrier rotatably supports a case 14 by a pair of axially extending bearing support trunnions 15 which are integral to the case and housed within a pair of annular trunnion bearings 16.

Figure 2:
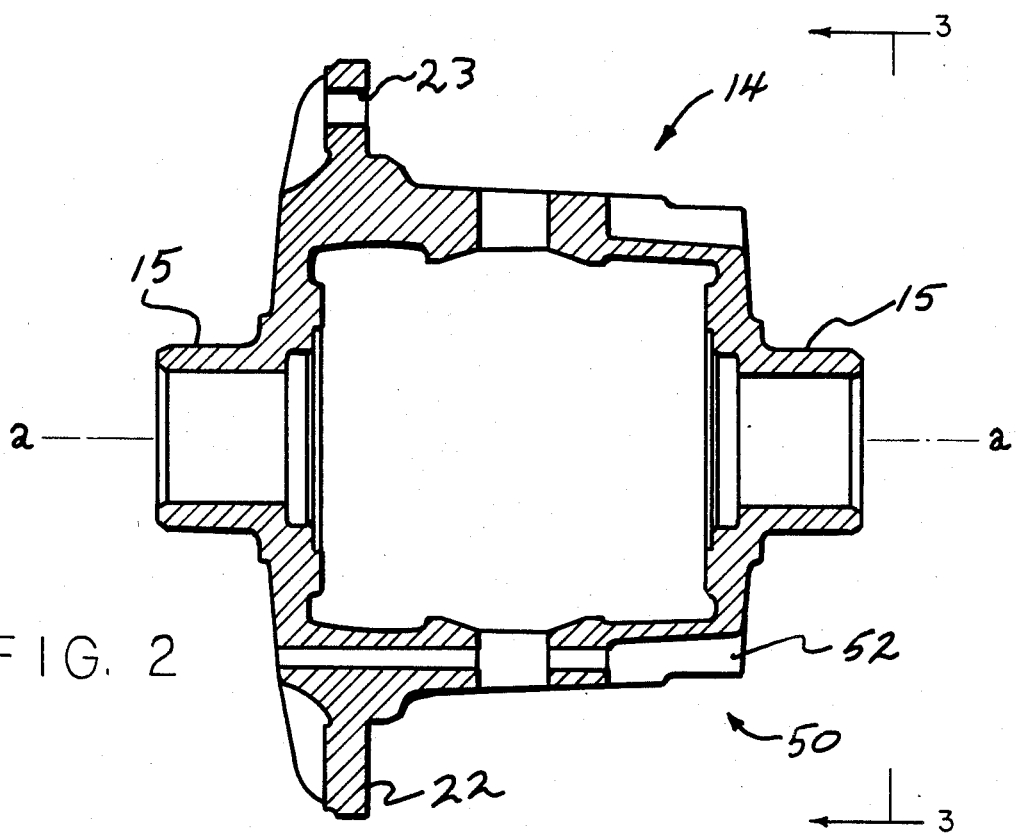
Fig. 2 is a cross sectional view of a differential case as incorporated in FIG. 1, constructed in accordance with the present invention.
Figure 3:
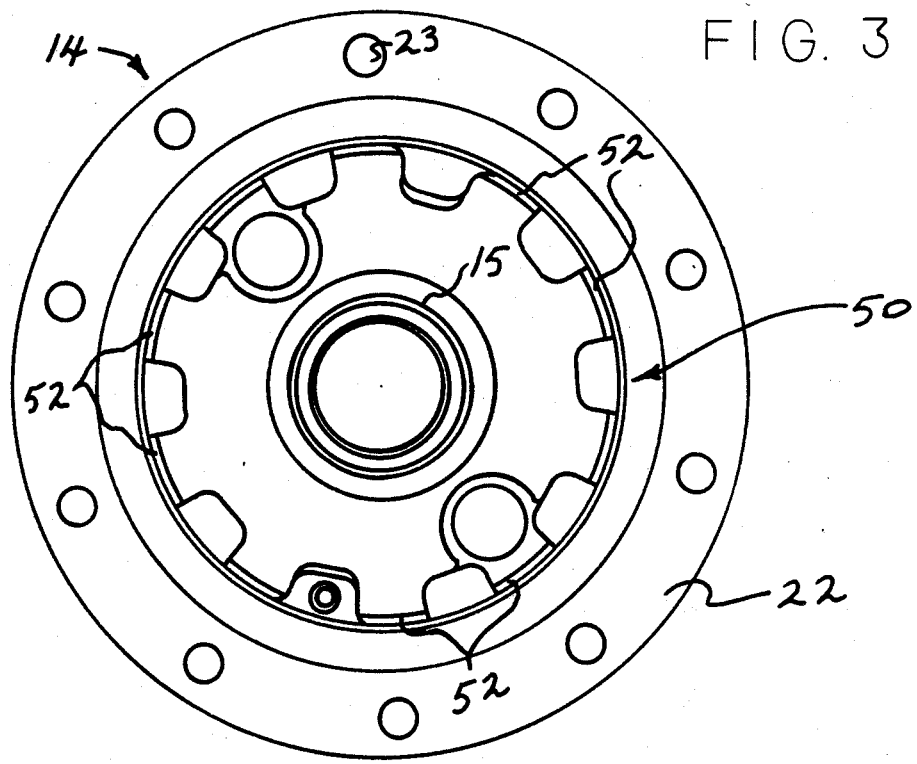
FIG. 3 is an end view of the differential case of FIG. 2 along the lines 3—3 thereof.

A drive pinion 18 is in constant mesh with a ring gear 20 bolted to a ring gear flange 22 (FIGS. 2 and 3). The ring gear flange 22 contains bolt apertures 23 to provide the aforesaid bolted securement of the ring gear. Rotation of the drive pinion 18 via a prime mover (not shown) causes the case 14 to rotate by means of the ring gear flange 22, which is also an integral part of the case 14.

The case 14 houses a differential gear set including a cross shaft 24 which supports a pair of rotatable differential pinions 26 for engagement with a pair of side or differential gears 28. The differential gears 28 are in turn splined to left and right half shafts 30 (only the right one of which is shown), and differential action is effected through conventional means. An optional clutch pack 32 may be utilized for effecting limited slip performance of the differential, as will be appreciated by those skilled in the present art.

An access cover plate 34 is provided on the external carrier 12, and is secured thereto by a plurality of threaded cover lugs 35, only one of which is shown. The cover plate 34 contains cooling fins 36 designed to facilitate proper cooling of the differential axle assembly. In the presently preferred embodiment, it will be noted that the half shafts 30 are rotatably supported within the external carrier 12 by respective axle bearings 38 (right one only shown) disposed on opposite sides of the housing 12. The case 14 is disposed for symmetrical rotation about axis "a—a" (FIG. 2), which is coincident with the axes of rotation of the half-shafts (not shown).

The present invention involves a special placement of an electronic speed sensing transducer 40 shown in FIG. 1. The transducer 40 includes a sensor body 42 from which extends a transducer pickup 44. The pickup element is rigidly held in position adjacent the rotatable case 14.

Referring momentarily to FIG. 2, the case 14 includes a small diameter end portion 50 located symmetrically with respect to the ring gear flange, but positioned on the opposite end of the case relative thereto. The end portion 50 includes a plurality of pickup teeth 52, seen more particularly in FIG. 3, which provide a conventional media for electronic pickup and sensing of angular rotational speeds of shafts, gears, and the like, as will be appreciated by those skilled in the art. In the presently preferred embodiment, the pickup 44 registers with the rotating teeth, radially spaced by a gap of 10 to 30 thousandths of an inch from each tooth at the instant of registration. There are ten such pickup teeth 52 which are utilized to accommodate the sensing function. A transmitter cable 46 (FIG. 1) is coupled to the speed sensing transducer 40 to convey the electronic information monitored thereby to an appropriate readout mechanism (not shown).

The benefits of the described presently preferred embodiment of the speed sensing differential assembly 10 are numerous. First, the transducer pickup 44 is entirely enclosed within the external carrier 12. To the extent that the pickup is not associated or in line with the ring gear flange as in many prior art arrangements, the pickup remains outside of the immediate splash and spray oil environment to which the ring gear flange is subjected. Moreover, an internal baffle 60 in the presently preferred embodiment is formed as an integral part of the cover plate 34. The baffle is effective to shield the pickup element from oil contamination.

The small diameter end portion 50 of the case 14 also provides the greatest accuracy potential for gap control between the pickup element 44 and the teeth 52. Thus, to the extent that the bearings rotate on differential trunnions, a tolerance of no greater than plus or minus two thousandths of an inch or less about the bearings is assured, as contrasted to greater tolerances conventionally associated with the ring gear under dynamic loading conditions. Moreover, to the extent that the teeth 52 are formed integrally within the small diameter end portion 50 of the case, the present invention requires no pressed rings or other external attachable parts, and hence minimizes the tooling requirements along with any seating or special machining problems inherent in the use of attached, non-integral parts.

Although only one presently preferred embodiment has been shown and described herein, the following claims are envisioned to cover numerous alternative embodiments which will fall into the spirit and scope thereof.

What is claimed is:

1. A speed sensing differential axle mechanism including a carrier, a differential case including a pair of opposed support trunnions, said case rotatably supported in said carrier by said pair of opposed trunnions, said case further including a body portion positioned intermediately of said trunnions, said body portion disposed for containing a differential gear set including a cross shaft supporting a pair of differential pinions, and a pair of side gears in mesh with said pinions, said body portion including a ring gear flange at a first end adjacent to but axially inwardly of one of said trunnions, and a small diameter end portion opposed to said first end and adjacent the other of said trunnion and positioned intermediately of said other trunnion and one of said side gears, said body portion having a diameter greater than that of either of said trunnions, said small diameter end portion comprising a plurality of spaced teeth, said teeth being integral to and formed as one part of said case and spaced uniformly thereabout, an electronic pickup element secured rigidly to said carrier and disposed for spaced registration with respect to said small diameter end portion of said case.

2. The speed sensing differential axle mechanism of claim 1 further comprising said pickup element being totally enclosed within said carrier, whereby said pickup element is protected from external environments.

3. The speed sensing differential axle mechanism of claim 2 further comprising an internal baffle on said carrier disposed for protection of said pickup element from circulating oil within said differential assembly.

4. The speed sensing differential axle mechanism of claim 3 wherein said integral teeth are formed by casting of same in said small diameter end portion of said case, wherein said differential axle mechanism further comprises a pair of differential trunnion bearings, and wherein said small diameter end portion of said differential case is machined for symmetrical rotation within the bearings about the rotational axis of the case.

5. The speed sensing differential axle mechanism of claim 4 wherein said case rotates within said carrier about trunnion bearings situated therebetween on a pair of opposed trunnions extending from said ring gear flange and said small end portion of said case, respectively; said radial tolerance of said case movement relative to said carrier comprising a maximum of two thousandths of an inch.

6. The speed sensing differential axle mechanism of claim 5 wherein said electronic pick-up element is radially spaced from said integral teeth of said small diameter end portion of said case.

7. The mechanism of claim 6 further comprising a removable access cover plate on said carrier, wherein said pickup element is rigidly secured to said cover plate.

8. In a speed sensing differential axle mechanism including a carrier, a differential case defining a body portion disposed for carrying a differential gear set, said body portion including a ring gear flange at one end thereof and a small diameter end portion at another end thereof opposite said end containing said ring gear flange, said case rotatably supported in said carrier by a pair of opposed trunnions, one positioned adjacent each end of said body portion; an improvement comprising said case including a plurality of teeth in said small diameter end portion thereof, said teeth being integral to and formed as one part of said case and spaced uniformly thereabout and disposed for rotation, a stationary electronic pickup element secured to said carrier, and disposed for spaced registration with respect to said small diameter end portion of said case.

9. The speed sensing differential axle mechanism of claim 8 further comprising said pickup element being totally enclosed within said carrier, whereby said pickup element is protected from external environments.

10. The speed sensing differential axle mechanism of claim 9 further comprising an internal baffle on said carrier disposed for protection of said pickup element from circulating oil within said differential assembly.

11. The speed sensing differential axle mechanism of claim 10 wherein said integral teeth are formed by casting of same in said small diameter end portion of said case, wherein said differential axle mechanism further comprises a pair of differential trunnion bearings, and wherein said small diameter end portion of said differential case is machined for symmetrical rotation within the bearings about the rotational axis of said case.

12. The speed sensing differential mechanism of claim 11 wherein said electronic pick-up element is radially spaced from said integral teeth of said small diameter end portion of said case.

* * * * *